US008817747B2

(12) United States Patent
Wong

(10) Patent No.: US 8,817,747 B2
(45) Date of Patent: Aug. 26, 2014

(54) ANCHOR CARRIER HANDOVER

(75) Inventor: Shin Horng Wong, Wiltshire (GB)

(73) Assignee: Alcatel Lucent, Boulogne-Billancourt (FR)

( * ) Notice: Subject to any disclaimer, the term of this patent is extended or adjusted under 35 U.S.C. 154(b) by 234 days.

(21) Appl. No.: 13/390,188

(22) PCT Filed: Aug. 3, 2010

(86) PCT No.: PCT/EP2010/004751
§ 371 (c)(1),
(2), (4) Date: Apr. 30, 2012

(87) PCT Pub. No.: WO2011/018173
PCT Pub. Date: Feb. 17, 2011

(65) Prior Publication Data
US 2012/0207133 A1 Aug. 16, 2012

(30) Foreign Application Priority Data

Aug. 13, 2009 (EP) .................................... 09360039

(51) Int. Cl.
H04W 4/00 (2009.01)
(52) U.S. Cl.
USPC ........... 370/331; 370/236; 370/328; 370/332; 370/349; 455/436; 455/456; 455/522; 455/569
(58) Field of Classification Search
USPC ......... 370/236, 328, 329, 331, 332, 333, 349; 455/436, 456, 522, 569
See application file for complete search history.

(56) References Cited

U.S. PATENT DOCUMENTS

| 6,097,958 | A * | 8/2000 | Bergen | 455/456.2 |
| 8,081,602 | B2 * | 12/2011 | Bernhard et al. | 370/331 |
| 8,416,745 | B2 * | 4/2013 | Julian et al. | 370/332 |
| 2006/0280142 | A1 * | 12/2006 | Damnjanovic et al. | 370/329 |
| 2007/0070908 | A1 * | 3/2007 | Ghosh et al. | 370/236 |

(Continued)

FOREIGN PATENT DOCUMENTS

EP 1 998 584 A1 12/2008

OTHER PUBLICATIONS

Qualcomm Europe, "Active Set and Mobility Management in DC-HSUPA," 3rd Generation Partnership Project (3GPP), 3GPP TSG RAN WG2 #66, R2-092994, San Francisco, USA, XP050340777, May 4-8, 2009.

(Continued)

*Primary Examiner* — Andrew Lai
*Assistant Examiner* — Andrew C Lee
(74) *Attorney, Agent, or Firm* — Fay Sharpe LLP

(57) ABSTRACT

A method of transferring anchor carrier status from a first carrier to another carrier in a multi-carrier wireless telecommunications network. The multi-carrier wireless telecommunications network comprises a base station and user equipment operable to simultaneously transmit and receive signals on multiple radio frequency carriers within a sector of the telecommunications network. The method comprises receiving details of a triggering event to be forwarded to a network node, the triggering event including a measurable characteristic of the first carrier changing past a predetermined first threshold value, providing triggering information indicative of the triggering event to a network node, determining which other carriers of the multicarrier telecommunications network have a measurable characteristic past a predetermined second threshold value, providing information relating to the above carriers to the network node, and transferring anchor carrier status to another carrier determined to have a measurable characteristic past the predetermined second threshold value.

15 Claims, 6 Drawing Sheets

(56) References Cited

U.S. PATENT DOCUMENTS

| | | | |
|---|---|---|---|
| 2008/0096560 A1* | 4/2008 | Felske et al. | 455/436 |
| 2008/0159233 A1* | 7/2008 | Achtari et al. | 370/332 |
| 2008/0254797 A1* | 10/2008 | Achtari et al. | 455/436 |
| 2008/0301773 A1* | 12/2008 | Achtari et al. | 726/3 |
| 2009/0042596 A1* | 2/2009 | Yavuz et al. | 455/522 |
| 2009/0097451 A1* | 4/2009 | Gogic | 370/331 |
| 2009/0270103 A1* | 10/2009 | Pani et al. | 455/436 |
| 2009/0279504 A1* | 11/2009 | Chin et al. | 370/331 |
| 2009/0280812 A1* | 11/2009 | Cheng et al. | 455/436 |
| 2010/0222059 A1* | 9/2010 | Pani et al. | 455/436 |

OTHER PUBLICATIONS

3GPP, "3$^{rd}$ Generation Partnership Project; Technical Specification Group Radio Access Network; Radio Resource Control (RRC); Protocol Specification (Release 8)," pp. 1545-1590, XP002586619, Jun. 24, 2009.

International Search Report for PCT/EP2010/004751 dated Oct. 6, 2010.

* cited by examiner

ANCHOR CARRIER HANDOVER

FIELD OF THE INVENTION

The present invention relates to a method of transferring anchor carrier status from a first carrier to another carrier in a multi-carrier wireless telecommunications network, a network node, base station, and user equipment operable to carry out that method and a computer program product.

BACKGROUND

Single carrier wireless telecommunications systems are known. In those known systems, radio coverage is provided to user equipment, for example, mobile telephones, by geographical area. A base station is located in each geographical area to provide the required radio coverage. User equipment in the area served by a base station receives information and data from the base station and transmits information and data to the base station.

Information and data transmitted by the base station to the user equipment occurs on channels of radio carriers known as downlink carriers. Information and data transmitted by user equipment to the base station occurs on uplink data channels of radio carriers known as uplink carriers.

In known single carrier wireless telecommunication systems, user equipment can move between geographical base station coverage areas. Service provided to user equipment is overseen by a radio network controller (RNC). The radio network controller communicates with user equipment and base stations and determines which base station each user equipment is primarily connected to. Furthermore, a radio network controller acts to control and communicate with a base station and user equipment when user equipment moves from the geographical area served by one base station to a geographical area served by another base station.

The area served by a given base station typically comprises several sectors which together define a coverage area for that base station. Typically a base station serves three sectors. Those sectors are typically served by separate antenna arrays provided on the base station. As well as controlling movement between base station coverage areas, the radio network controller also has visibility of, and communicates with, a base station and user equipment when user equipment moves between sectors within a coverage area served by a single base station.

Movement between sectors provided by a single base station and movement between coverage areas, that is to say movement between base stations are known as "mobility events" or "handover" and are overseen by the radio network controller. In a single carrier telecommunications system, those mobility events are notified to and controlled by the radio network controller via a single carrier.

It is proposed to allow base stations and user equipment to each transmit simultaneously on more than one carrier. Furthermore it is proposed to allow user equipment and base stations to receive simultaneously on more than one carrier frequency. Each carrier, both uplink and downlink, is typically independently power controlled and independently scheduled by a base station. Dual cell high speed uplink packet access (DC-HSUPA) will allow user equipment to transmit data on two adjacent frequency carriers. This allows for an increase in data throughput from the user equipment. Networks having more than two carriers may be referred to as "multi cell high speed uplink packet access" (MC-HSUPA) networks. The term "multi-carrier" network used herein is envisaged to cover both DC-HSUPA and (MC-HSUPA) networks.

In a typical multi-carrier wireless telecommunications network one of the carriers provided is known as an "anchor" or "primary carrier". The anchor carrier has a particular functional purpose, and whilst a particular user equipment may be able to receive and transmit on one or more carrier simultaneously, the anchor uplink and downlink carriers are the carriers upon which a radio network controller monitors, controls and instructs the "mobility events" referred to above. A radio network controller relies upon uplink and downlink anchor carriers to maintain full visibility and control of a particular user equipment. That is to say, the anchor carrier provides essential control channels for downlink operation and mobility events are managed based upon measurements made by user equipment and reported on the anchor carrier uplink. It can be therefore understood that if an anchor carrier downlink radio link fails, user equipment may be forced to declare radio link failure even if a further carrier downlink radio link is available. If there is no anchor carrier a network is unaware of the condition of user equipment. In the event that radio link failure is declared, the user equipment may reconnect to the network via a different carrier to regain a HSUPA throughput. That reconnection process takes time.

Accordingly it is desired to improve the resilience of a multi-carrier wireless telecommunication network in the event of anchor carrier failure.

SUMMARY

Accordingly, a first aspect provides a method of transferring anchor carrier status from a first carrier to another carrier in a multi-carrier wireless telecommunications network, said multi-carrier wireless telecommunications network comprising a base station and user equipment operable to simultaneously transmit and receive signals on more than one radio frequency carrier within a sector of said telecommunications network, the method comprising the steps of:
  receiving details of a triggering event to be notified to a network node;
  the triggering event comprising a change in a measurable characteristic of the first carrier past a predetermined first threshold value;
  providing triggering information indicative of the triggering event to a network node;
  determining which of the other carriers of the multi-carrier telecommunications network have a measurable characteristic past a predetermined second threshold value;
  providing information relating to carriers determined to have a measurable characteristic past the predetermined second threshold value to the network node; and
  transferring anchor carrier status, in response to a received signal generated in response to receipt of said information relating to carriers and said triggering information, to one of the carriers determined to have a measurable characteristic past said predetermined second threshold value.

It was proposed in by the 3rd Generation Partnership Project (3GPP) that in a multi-carrier wireless telecommunications network environment an anchor carrier would be specified. The anchor carrier was proposed to act to support mobility events. It was further proposed that in the event that a second carrier (non-anchor) downlink radio link failed whilst user equipment had an active anchor carrier downlink radio link, the user equipment would not operate to declare radio link failure but would continue to operate via the anchor carrier. Such an approach seems logical, since a high speed uplink packet access network cannot successfully operate without knowing the condition of user equipment and which base station user equipment is primarily attached to. Thus, if the anchor carrier downlink radio link fails user equipment would declare a radio link failure even if an active second carrier downlink radio link was available.

The first aspect recognises that by maintaining constant anchor carrier functionality user equipment employing a method in accordance with the first aspect is visible to a network node and is considered to form a part of a multi-carrier wireless telecommunications network, without interruption.

The first aspect recognises that by transferring anchor carrier status when a first carrier experiences radio link failure, it is possible to ensure that a user experiences no interruption to service. By transferring anchor carrier status from a first carrier to another carrier prior to radio link failure whilst the user equipment is still synchronised with one or more further carriers, user equipment employing the first aspect may no longer need to leave cell-DCH state. Furthermore, a radio network controller can maintain visibility of user equipment employing a method in accordance with the first aspect.

The first aspect recognises that it is possible to transfer anchor carrier status and move particularly, anchor carrier functionality to an active second carrier downlink radio link, if available.

Transfer of anchor carrier status in response to a triggering event ensures the status is not unnecessarily changed. The particular triggering event of the first aspect recognises that if a radio link becomes weak there is a possibility it will eventually fail. As a radio link becomes weaker, network equipment is forced to transmit on an unnecessarily high power on the anchor carrier to try to maintain the radio link. If a second carrier is more suitable to act as an anchor carrier, that transmission at an unnecessarily high power can be avoided by transferring anchor carrier status from a first carrier to a second carrier in accordance with the first aspect.

The first aspect aims to avoid having to declare radio link failure unnecessarily and to utilise innate radio link frequency diversity available in multi-carrier wireless telecommunications network.

The first aspect has particular advantages if a transfer occurs in a case where user equipment and a base station are operable to employ the first aspect. If user equipment has one or more active uplink carriers and one or more active downlink carriers that user equipment will be fully synchronised to a base station on those carriers. If user equipment is active, and transmitting voice or other information to a base station, it is referred to as being in a "cell DCH" state. In this case there is a dedicated radio link between the user equipment and a base station. If an anchor carrier signal becomes weak whilst the user equipment is active, transfer of anchor carrier status to one of the other carriers ensures that the user equipment does not need to declare radio link failure. Furthermore, since the base station and user equipment are already synchronised on the carrier to which anchor carrier status is transferred, any disruption to service experienced by a user is minimised by a transfer according to the first aspect.

It will be understood that there is, in a multi-carrier network, both a downlink anchor carrier and an uplink anchor carrier. The first aspect can operate to transfer either or both downlink or uplink anchor carrier status, It will also be understood that if a downlink carrier fails, that will lead to the consequent failure of a corresponding uplink anchor carrier.

In a typical known user equipment-base station interaction, an item of user equipment maintains a list of cells (one cell is equivalent to a base station sector, served by a particular carrier frequency) with which that user equipment has a radio link connection. That list is known as a Dedicated Channel Active Set (DCH Active Set). It will be appreciated that user equipment may have radio link with more than one base station.

Furthermore, user equipment maintains a list of cells with which that user equipment has a HSUPA connection. That list is known as an Enhanced Dedicated Channel Active Set (E-DCH Active Set). The E-DCH Active Set can be identical to, or a sub-set of the DCH Active Set.

It will be understood that a method according to the first aspect may be carried out particularly with respect to measurement quantities related to the cells in the E-DCH Active set of a specific carrier. That is to say, a carrier may, for example, exist as a carrier is adjacent base stations. User equipment may receive a signal relating to a carrier in relation to a sector supported by a first base station and also receive a signal relating that carrier in relation to a sector supported by a second base station. IN other words, a carrier may support two cells.

This it will be understood that the triggering event of the first aspect may be more specifically defined in such a case. In particular, since the anchor carrier may comprise more than one cell, it may be that a measurement quantity relating to a cell on that anchor carrier degrading below a threshold to cause a triggering event.

Furthermore, since each carrier may comprise more than one cell, in determining which carriers have a measurement quantity past a threshold, it may also be possible to determine which cell provided by a carrier frequency has a measurement quantity past a predetermined threshold.

In one embodiment, the triggering event comprises a measurable characteristic of the first carrier changing past a predetermined first threshold value for a predetermined period of time and the triggering information indicates to the network node that a measurable characteristic of the first carrier changing a predetermined first threshold value for a predetermined period of time should occur before the generated signal is provided.

Accordingly, the triggering event of interest may be the falling of a measurable characteristic of said first carrier beneath a predetermined first threshold value, or exceeding that predetermined value (depending upon the measurement quantity chosen) for a particular period of time. It will be appreciated that through this approach, anchor carrier status is not transferred unnecessarily and a network node is only informed of the trigger event when the measurable characteristic of the first carrier changes past a predetermined threshold value for a particular period of time.

In one embodiment, the triggering event further comprises a measurable characteristic of the first carrier changing past a predetermined first threshold value whilst another carrier is determined to have a measurable characteristic past a predetermined second threshold value, and the triggering information indicates to the network node that a measurable characteristic of the first carrier has changed past a predetermined first threshold value and that a carrier has been determined to have a measurable characteristic past a predetermined second threshold value before the generated signal is provided.

Accordingly, if no possible new anchor carrier can be identified, no trigger event is notifiable and no transfer signal is generated by a network node. No transfer of anchor carrier status is possible in the event that no carrier is available to support a radio link between, for example, user equipment and a base station.

In one embodiment, the step of determining comprises: the step of calculating for each other carrier a value by which the measurable characteristic has past the predetermined second threshold value, and the step of providing information relating to carriers determined to have a measurable characteristic past the predetermined second threshold value comprises: the step of providing an indication of the value by which each carrier passes the predetermined second threshold.

Accordingly, the network node is provided with information which may ensure that anchor carrier status is transferred to the most suitable available alternative carrier. That is to say, anchor carrier status may be transferred to that carrier determined by the network node to best meet requirements.

In one embodiment, the method further comprises the step of determining which carrier passes said predetermined second threshold by a value determined to be the largest. Accordingly, the network node may be told which carrier has past said predetermined second threshold by the largest amount and therefore it may be indicated to the network node which carrier is most suitable for transfer of anchor carrier status.

In one embodiment, each carrier comprises one or more cells, and the triggering event comprises a change in a measurable characteristic of a cell of the first carrier past a predetermined threshold value; and wherein the method further comprises the steps of:
  determining which of the cells of each carrier determined to have a measurable characteristic past a predetermined second threshold value have a measurable characteristic past a predetermined third threshold value; and
  providing information relating to the cells having a measurable characteristic past a predetermined third threshold value, of each carrier determined to have a measurable characteristic past the predetermined second threshold value to the network node; and
  transferring anchor carrier status to a cell of a carrier, in response to a received signal generated in response to receipt of the information relating to carriers, information relating to cells and said triggering information, to one of the cells of one of the carriers determined to have a measurable characteristic past the predetermined second threshold value.

Accordingly, this allows the method of the first aspect to operate to transfer to the most appropriate cell of a most appropriate carrier. A network node requires information relating to the cells of each carrier so that it can operate to transfer anchor carrier status to the most appropriate cell of the most appropriate alternative carrier.

In one embodiment, the measurable characteristic comprises an indication representative of signal strength, signal to noise ratio, or path loss experienced by each carrier. Accordingly, it will be appreciated that various measurement quantities can be used to determine the strength of the anchor carrier radio link experienced, for example, by user equipment or by a base station. It may, for example, be possible to determine strength of anchor carrier downlink by considering the received signal strength at user equipment. It may, for example, be possible to determine the strength of the downlink radio link by determining a pilot channel energy per chip over noise ratio, or for example, it may be possible to generate an indication of the strength of a radio link from a measured path loss.

In one embodiment, the predetermined first threshold is set at a minimum level required by user equipment or a base station to maintain a radio link. In one embodiment, the predetermined second threshold is set at the minimum level required for a user equipment to maintain a radio link. In one embodiment, the predetermined second threshold is set above a minimum level required to maintain an active radio link.

In one embodiment, the predetermined first, second, or third threshold is set at a minimum level required by user equipment or a base station to maintain a radio link.

In one embodiment, the predetermined second or third threshold is set above a minimum level required to maintain an active radio link.

In one embodiment, the predetermined first threshold and predetermined second threshold are substantially identical.

Choosing the thresholds in relation to the sustainability of maintenance of an active radio link can help to ensure the first aspect is employed when an anchor carrier radio link is about to fail, and that transfer occurs only to those carriers capable of sustaining an active radio link.

A second aspect provides a computer program product operable, when executed on a computer, to perform the method steps of the first aspect.

A third aspect provides user equipment operable to transfer anchor carrier status from a first carrier to another carrier in a multi-carrier wireless telecommunications network, said multi-carrier wireless telecommunications network comprising a base station and user equipment operable to simultaneously transmit and receive signals on more than one radio frequency carrier within a sector of said telecommunications network, said user equipment comprising:
  triggering event reception logic operable to receive details of a triggering event to be notified to a network node; said triggering event comprising a measurable characteristic of said first carrier changing past a predetermined first threshold value;
  trigger information transmission logic operable to provide triggering information indicative of said triggering event to a network node;
  carrier assessment logic operable to determine which of the other carriers of the multi-carrier telecommunications network have a measurable characteristic past a predetermined second threshold value;
  carrier assessment transmission logic operable to provide information relating to carriers determined to have a measurable characteristic past said predetermined second threshold value to the network node;
  transfer reception logic operable to receive a transfer signal generated in response to receipt of said information relating to carriers and said triggering information; and
  transfer implementation logic operable to transfer anchor carrier status to one of the carriers determined to have a measurable characteristic past said predetermined second threshold value.

It will be appreciated that the method of the first aspect has particular advantages when implemented in user equipment to be used in a multi-carrier wireless telecommunications network. In particular, it will be appreciated that transfer of anchor carrier status will be particular necessary when user equipment recognises that a current anchor carrier is about to lose radio link status. In that situation, in order to avoid loss of radio link it is advantageous to take steps to ensure that anchor carrier status is transferred to a second carrier. It would be possible for user equipment to simply declare radio link failure when an anchor downlink radio link fails and then reconnect to the network on a different carrier. Such an arrangement would, however, cause user equipment to transfer from a dedicated cell-DCH transmission state to a non cell-DCH state and the user equipment would temporarily lose its dedicated high speed uplink packet access radio resource and its ability to transmit at high throughput. Furthermore, the re-establishment process of transferring a radio link to the second carrier takes time, which requires layer one synchronisation. Such a process causes interruption to a user service (for example, any ongoing data transfer procedure will be interrupted). From a user experience perspective, such an interruption is particularly undesirable. The method of the first aspect, user equipment in accordance with the third aspect or a base station in accordance with a fourth aspect, aims to avoid or mitigate those problems.

In one embodiment, the triggering event comprises a measurable characteristic of the first carrier changing past a predetermined first threshold value for a predetermined period of time and the triggering information indicates to the network node that a measurable characteristic of the first carrier changing a predetermined first threshold value for a predetermined period of time should occur before the generated signal is provided.

In one embodiment, the triggering event further comprises a measurable characteristic of the first carrier changing past a predetermined first threshold value whilst another carrier is determined to have a measurable characteristic past a predetermined second threshold value, and the triggering information indicates to the network node that a measurable characteristic of the first carrier has changed past a predetermined first threshold value and that a carrier has been determined to have a measurable characteristic past a predetermined second threshold value before the generated signal is provided.

In one embodiment, the carrier assessment logic is further operable calculate, for each other carrier, a value by which the measurable characteristic has past the predetermined second threshold value, and the carrier assessment transmission logic operable to provide information relating to carriers determined to have a measurable characteristic past the predetermined second threshold value is further operable to provide an indication of the value by which each carrier passes the predetermined second threshold.

In one embodiment, the carrier assessment logic is further operable to of determine which carrier passes the predetermined second threshold by a value determined to be the largest.

In one embodiment, each carrier further comprises one or more cells, and the triggering event comprises a change in a measurable characteristic of a cell of the first carrier past a predetermined threshold value; and wherein the user equipment further comprises:
  cell assessment logic operable to determine which of the cells of each carrier determined to have a measurable characteristic past a predetermined second threshold value have a measurable characteristic past a predetermined third threshold value; and
  cell assessment transmission logic operable to provide information relating to the cells having a measurable characteristic past a predetermined third threshold value, of each carrier determined to have a measurable characteristic past the predetermined second threshold value to the network node; and wherein
  transfer reception logic is further operable to receive a transfer signal generated in response to receipt of said information relating to carriers, information relating to cells and said triggering information; and
  transfer implementation logic operable to transfer anchor carrier status to one of the cells determined to have a measurable characteristic past the third predetermined threshold value of a carrier determined to have a measurable characteristic past said predetermined second threshold value.

In one embodiment, the measurable characteristic comprises an indication representative of signal strength, signal to noise and interference ratio, or path loss experienced by each carrier or cell.

In one embodiment, the predetermined first, second, or third threshold is set at a minimum level required by user equipment or a base station to maintain a radio link.

In one embodiment, the predetermined second or third threshold is set above a minimum level required to maintain an active radio link.

In one embodiment, the predetermined first threshold and predetermined second threshold are substantially identical.

A fourth aspect provides a base station operable to transfer anchor carrier status from a first carrier to another carrier in a multi-carrier wireless telecommunications network, said multi-carrier wireless telecommunications network comprising a base station and user equipment operable to simultaneously transmit and receive signals on more than one radio frequency carrier within a sector of said telecommunications network, said base station comprising:
  triggering event reception logic operable to receive details of a triggering event to be notified to a network node; said triggering event comprising a measurable characteristic of the first carrier changing past a predetermined first threshold value;
  trigger information transmission logic operable to provide triggering information indicative of the triggering event to a network node;
  carrier assessment logic operable to determine which of the other carriers of the multi-carrier telecommunications network have a measurable characteristic past a predetermined second threshold value;
  carrier assessment transmission logic operable to provide information relating to carriers determined to have a measurable characteristic past the predetermined second threshold value to the network node;
  transfer reception logic operable to receive a transfer signal generated in response to receipt of the information relating to carriers and said triggering information; and
  transfer implementation logic operable to transfer anchor carrier status to one of the carriers determined to have a measurable characteristic past the predetermined second threshold value.

In one embodiment, the triggering event comprises a measurable characteristic of the first carrier changing past a predetermined first threshold value for a predetermined period of time and the triggering information indicates to the network node that a measurable characteristic of the first carrier changing a predetermined first threshold value for a predetermined period of time should occur before the generated signal is provided.

In one embodiment, the triggering event further comprises a measurable characteristic of the first carrier changing past a predetermined first threshold value whilst another carrier is determined to have a measurable characteristic past a predetermined second threshold value, and the triggering information indicates to the network node that a measurable characteristic of the first carrier has changed past a predetermined first threshold value and that a carrier has been determined to have a measurable characteristic past a predetermined second threshold value before the generated signal is provided.

In one embodiment, the carrier assessment logic is further operable calculate, for each other carrier, a value by which the measurable characteristic has past the predetermined second threshold value, and the carrier assessment transmission logic operable to provide information relating to carriers determined to have a measurable characteristic past the predetermined second threshold value is further operable to provide an indication of the value by which each carrier passes the predetermined second threshold.

In one embodiment, the carrier assessment logic is further operable to of determine which carrier passes the predetermined second threshold by a value determined to be the largest.

In one embodiment, each carrier further comprises one or more cells, and the triggering event comprises a change in a measurable characteristic of a cell of the first carrier past a predetermined threshold value; and wherein the base station further comprises:
  cell assessment logic operable to determine which of the cells of each carrier determined to have a measurable characteristic past a predetermined second threshold value have a measurable characteristic past a predetermined third threshold value; and
  cell assessment transmission logic operable to provide information relating to the cells having a measurable characteristic past a predetermined third threshold value, of each carrier determined to have a measurable characteristic past the predetermined second threshold value to the network node; and wherein
  transfer reception logic is further operable to receive a transfer signal generated in response to receipt of said information relating to carriers, information relating to cells and said triggering information; and
  transfer implementation logic operable to transfer anchor carrier status to one of the cells determined to have a measurable characteristic past the third predetermined threshold value of a carrier determined to have a measurable characteristic past said predetermined second threshold value.

In one embodiment, the measurable characteristic comprises an indication representative of signal strength, signal to noise and interference ratio, or path loss experienced by each carrier or cell.

In one embodiment, the predetermined first, second, or third threshold is set at a minimum level required by user equipment or a base station to maintain a radio link.

In one embodiment, the predetermined second or third threshold is set above a minimum level required to maintain an active radio link.

In one embodiment, the predetermined first threshold and predetermined second threshold are substantially identical.

A fifth aspect provides a method of providing a transfer notification instructing transfer of anchor carrier status from a first carrier to another carrier in a multi-carrier wireless telecommunications network, said multi-carrier wireless telecommunications network comprising a base station and user equipment operable to simultaneously transmit and receive signals on more than one radio frequency carrier within a sector of said telecommunications network, in response to a triggering event comprising a measurable characteristic of said first carrier changing past a predetermined first threshold value, said method comprising the steps of:
  receiving triggering information indicative of said triggering event,
  receiving information relating to any other carrier determined to have a measurable characteristic past a predetermined second threshold value;
  generating a transfer notification in response to said information relating to carriers determined to have a measurable characteristic past said predetermined second threshold value and said triggering information, said transfer notification instructing transfer of anchor carrier status to one of the carriers determined to have a measurable characteristic past said predetermined second threshold value; and transmitting said transfer notification.

The fifth aspect recognises that a transfer notification needs to be generated when particular conditions are met. Most particularly, it is necessary to generate a transfer notification when a current anchor carrier is about to fail and another carrier is available to adopt anchor carrier status. The method of the fifth aspect may be carried out by user equipment, a base station or may be carried out by a radio network controller remotely from said user equipment. A network node may be a base station or a radio network controller.

In one embodiment, the triggering event further comprises a measurable characteristic of the first carrier changing past a predetermined first threshold value whilst another carrier is determined to have a measurable characteristic past a predetermined second threshold value, and the triggering information indicative of the triggering event indicates that a measurable characteristic of the first carrier has changed past a predetermined first threshold value and a carrier has been determined to have a measurable characteristic past a predetermined second threshold value before the transfer notification is generated.

In one embodiment, the step of receiving information further comprises the step of receiving information for each carrier representative of a value by which the measurable characteristic is past the predetermined second threshold value.

In one embodiment, the step of generating a transfer notification further comprises the step of calculating which of the carriers determined to have a measurable characteristic past the second predetermined threshold value, is past the predetermined threshold value by the largest amount and the transfer notification instructs transfer of anchor carrier status from the first carrier to a carrier determined to be past the second predetermined threshold by the largest amount.

In one embodiment, each carrier comprises one or more cells, and the method further comprises the step of:
  receiving triggering information indicative of said triggering event,
  receiving information relating to any other carrier determined to have a measurable characteristic past a predetermined second threshold value;
  receiving information relating to cells of a carrier determined to have a measurable characteristic past a predetermined third threshold value;
  generating a transfer notification in response to the information relating to carriers determined to have a measurable characteristic past said predetermined second threshold value, the cells of a carrier determined to have a measurable characteristic past a third threshold value and said triggering information, said transfer notification instructing transfer of anchor carrier status to one of the cells to have a measurable characteristic past a predetermined third threshold value, in one of the carriers determined to have a measurable characteristic past said predetermined second threshold value; and
  transmitting said transfer notification.

A sixth aspect provides a computer program product, operable when executed on a computer, to perform the method steps of the fifth aspect.

A seventh aspect provides a network node operable to provide a transfer notification instructing transfer of anchor carrier status from a first carrier to another carrier in a multi-carrier wireless telecommunications network in response to a triggering event comprising a measurable characteristic of said first carrier changing past a predetermined first threshold value, said multi-carrier wireless telecommunications network comprising a base station and user equipment operable to simultaneously transmit and receive signals on more than one radio frequency carrier within a sector of said telecommunications network, said network node comprising:

> reception logic operable to receive triggering information indicative of said triggering event,
>
> carrier reception logic operable to receive information relating to carriers determined to have a measurable characteristic past a predetermined second threshold value; and
>
> transfer notification generation logic operable to generate a transfer notification in response to said information relating to carriers determined to have a measurable characteristic past said predetermined second threshold value and said triggering information,
>
> transfer notification transmission logic operable to transmit said transfer notification instructing transfer of anchor carrier status to one of the carriers determined to have a measurable characteristic past said predetermined second threshold value.

The seventh aspect recognises that the method of the fifth aspect is particularly advantageous when implemented by a network node, and in particular, a network controller. Furthermore, it will be appreciated that apparatus features corresponding to those method steps of the fifth aspect may be provided by embodiments of the seventh aspect.

It will also be appreciated that it is possible to implement the method of the fifth aspect in user equipment, or a base station without unnecessary adaptation.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings in which.

DESCRIPTION OF THE EMBODIMENTS

Figure 1:
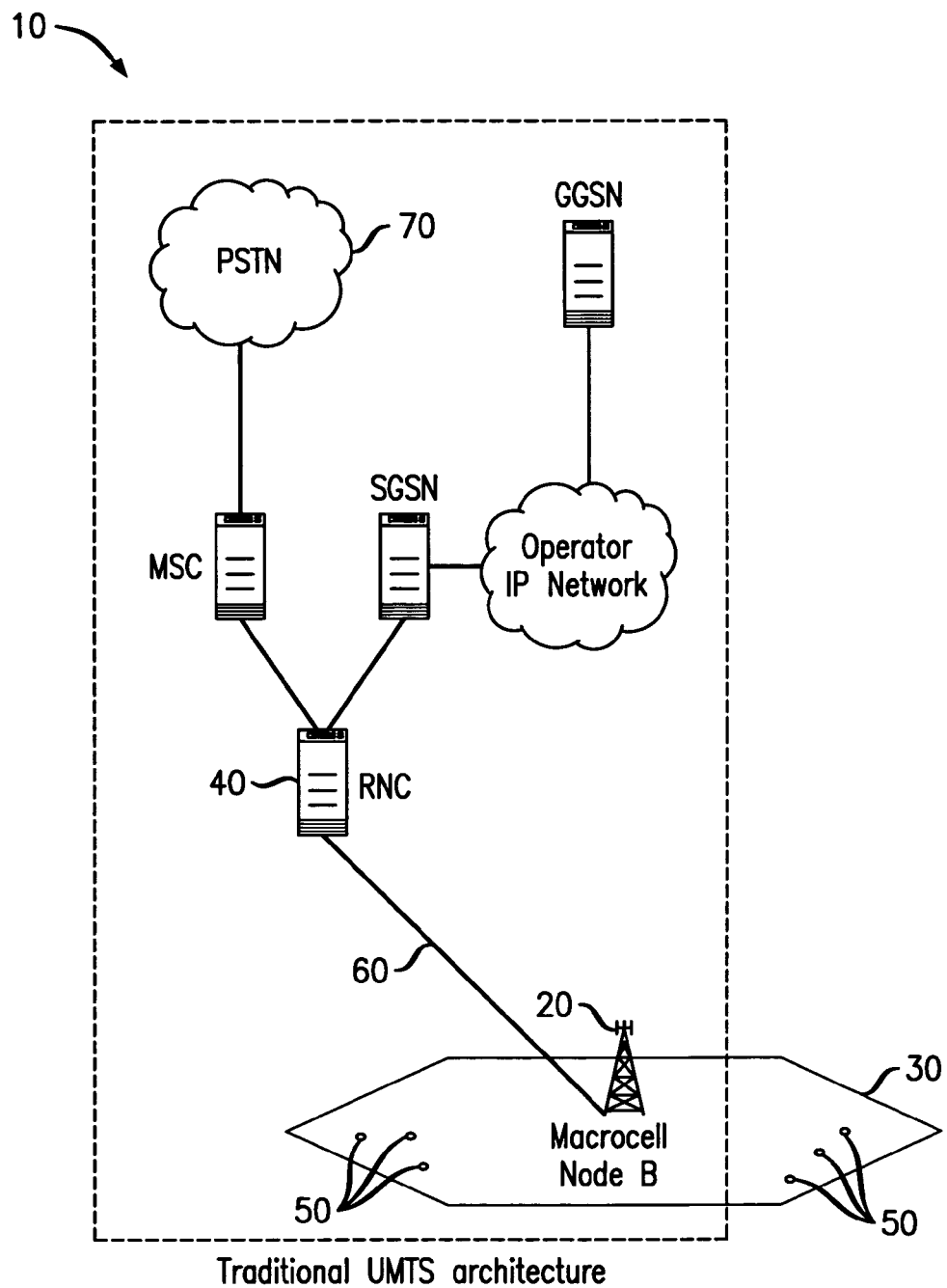
FIG. 1 illustrates the main components of a telecommunications network according to one embodiment.

FIG. 1 illustrates a wireless telecommunications system 10 according to one embodiment. User equipment 50 roam through the wireless telecommunications system. Base stations 20 are provided which support areas of radio coverage 30. A number of such base stations 20 are provided and are distributed geographically in order to provide a wide area of coverage to user equipment 50. When user equipment is within an area served by a base station 30, communications may be established between the user equipment and the base station over associated radio links. Each base station typically supports a number of sectors within the geographical area of service 30.

Typically a different antenna within a base station supports each associated sector. Accordingly, each base station 20 has multiple antennas and signals sent through the different antennas are electronically weighted to provide a sectorised approach. Of course, it will be appreciated that FIG. 1 illustrates a small subset of the total number of user equipment and base stations that may be present in a typical communications system.

The wireless communications system is managed by a radio network controller (RNC) 40. The radio network controller 40 controls operation of the wireless communications system by communicating with a plurality of base stations over a backhaul communications link 60. The network controller also communicates with user equipment 50 via each base station and thus effectively manages the entire wireless communications system.

In a multi-carrier system, each sector served by a base station can have several carrier frequencies or "carriers" associated therewith. A carrier or cell supported by a carrier covers the same geographical region as a sector. Each cell is served by a different carrier frequency. It will therefore be understood that in a single carrier system, a cell is equivalent to a sector since a sector has only one cell or carrier frequency. Nonetheless, in a multi-carrier network each sector may comprise several cells each cell being served simultaneously by a different carrier frequency.

A radio network controller 60 maintains a neighbour list which includes information about geographical relationships between sectors supported by base stations 20. In addition, the radio network controller 60 maintains location information which provides information on the location of user equipment 50 within the wireless communication system 10. The radio network controller is operable to route traffic via circuit switched and packet switched networks. Hence, a mobile switching centre is provided with which the radio network controller may communicate. The mobile switching centre can communicate with a circuit switched network such as a public switched telephone network (PSTN) 70. Similarly, a network controller can communicate with service general package radio service support nodes (SGSNs) and a gateway general packet support node (GGSN). The GGSN can communicate with a packet switched core such as for example, the Internet.

User equipment 50 typically transmits information and data to a base station 20 so that it can be re-routed within a wireless telecommunications network. User equipment may, for example, need to transmit data to the base station in order to relay text messages, voice information when a user is using the equipment to make a telephone call, or other data. The base station 20, in combination with parameters set by the radio network controller 40, allocates resource to user equipment in a manner that aims to optimise operation of the wireless telecommunications network 10.

A radio link is a dedicated connection between user equipment 50 and a cell of a base station. These dedicated radio links are formed when user equipment is in a "cell-DCH" state. When user equipment is not transmitting information such as text messages or voice information to a base station it is in a so-called "Idle" state. When user equipment has information to transmit to a base station it chooses a connected state within which to operate. When in a "cell-DCH" state user equipment is able to use high speed uplink packet access radio resources to achieve a high uplink throughput.

User equipment has uplink and downlink radio links. When a downlink (a connection between a base station and user equipment) radio link failure occurs user equipment declares a radio link failure and moves away from a cell-DCH state. More particularly, if it moves away from the cell-DCH state and loses the ability to operate in high speed uplink packet access mode. In a multi-carrier system, each carrier will have independent downlink radio links from a base station to user equipment. Those downlink radio links are managed independently since each carrier will likely have different radio propagation paths to user equipment.

In a multi-carrier system it has been agreed that one of the carriers acts as a so-called anchor or primary carrier. The anchor carrier functionally operates such that it is used as a basis upon which mobility events and handover are determined. As described previously, the condition of user equipment within a wireless telecommunications network is determined on an anchor carrier by the radio network controller. Whenever user equipment moves between sectors of a base station, or between sectors of adjacent base stations, the radio network controller is notified and communicates with the base stations and user equipment such that these mobility events are noted and efficiently handled.

In a multi-carrier system it is proposed that these mobility events are determined on an anchor carrier. Without an anchor carrier, or when radio link failure occurs on the anchor carrier, the wireless telecommunications network no longer has visibility of the condition of an item of user equipment. This would occur irrespective of whether another carrier provided in the multi-carrier system is still operable.

In general, it has been agreed that if a non-anchor carrier downlink radio link fails whilst the anchor carrier downlink radio link remains active, a item user equipment does not declare radio link failure but continues to operate in the active dedicated link cell-DCH state via the anchor carrier. However, it has also been proposed that if an anchor carrier downlink radio link fails, user equipment will declare radio link failure even, if the second carrier downlink radio link is available. This will result in user equipment declaring radio link failure and moving away from its dedicated cell-DCH state, losing its high speed uplink packet access radio resources, and interrupting service to a user.

It has been recognised, that it would be possible to maintain an effectively uninterrupted service to an end user if it were possible for the network to allow anchor carrier status to be transferred from one carrier to another carrier in a multi-carrier network. Transfer of anchor carrier status would allow services provided to a user to continue interrupted and user equipment would not declare radio link failure and move away from a connected cell-DCH state. As a result, user equipment would not lose high speed uplink packet access radio resources and service to a user is maintained.

Figure 2:
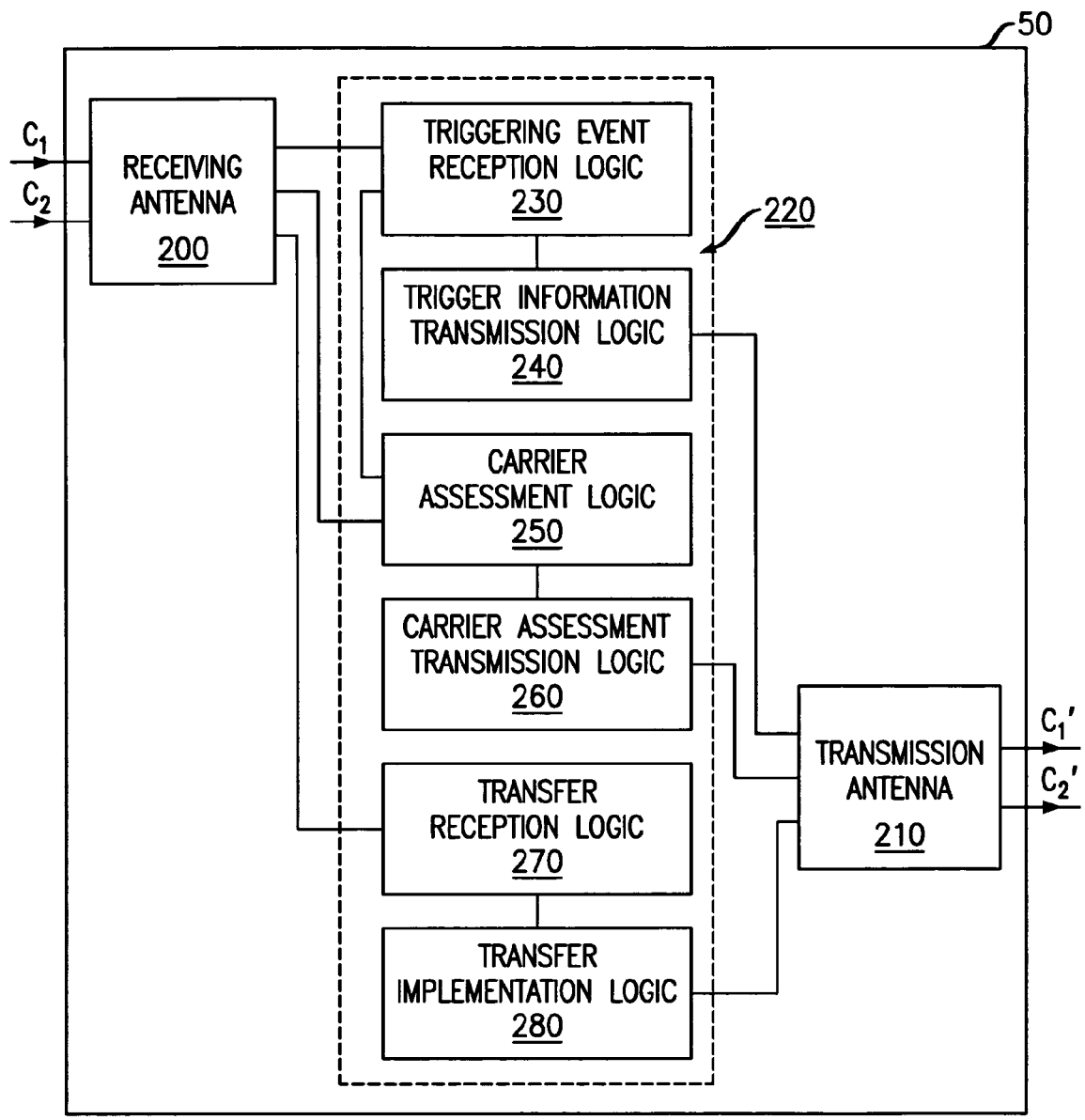
FIG. 2 illustrates components of user equipment for use in the telecommunications network of FIG. 1.

FIG. 2 illustrates the main components of user equipment for use in the telecommunications network of FIG. 1 employing such a transfer of anchor status capability. User equipment 50 comprises: a reception antenna 200, a transmission antenna 210 and a user equipment controller 220. The reception antenna 200 is operable to simultaneously receive transmissions on more than one carrier. In the embodiment shown, the receptions antenna is operable to receive data and information transmitted on downlink carriers indicated by C1 and C2. Whilst in this embodiment the reception antenna receives two carrier frequencies it is generally possible for reception antenna to receive information on more than two carriers.

Transmission antenna 210 is operable to simultaneously transmit information from user equipment 50 on a plurality of carriers. In the embodiments shown in FIG. 2, the transmission antenna separable to transmit data and information on carriers C1' and C2'.

User equipment controller 220 further comprises triggering event reception logic 230, trigger information transmission logic 240, carrier assessment logic 250, transfer reception logic 260 and transfer implementation logic 270. The reception antenna 200 is operable to communicate with triggering event reception logic 230, carrier assessment logic 250 and transfer reception logic 260. Transmission antenna 210 is operable to receive signals and instructions from trigger information transmission logic 240, carrier assessment logic 250 and transfer implementation logic 270. The method of operation of the user equipment of FIG. 2 will be described in more detail in relation to the main processing steps illustrated by FIG. 5 below.

Figure 3:
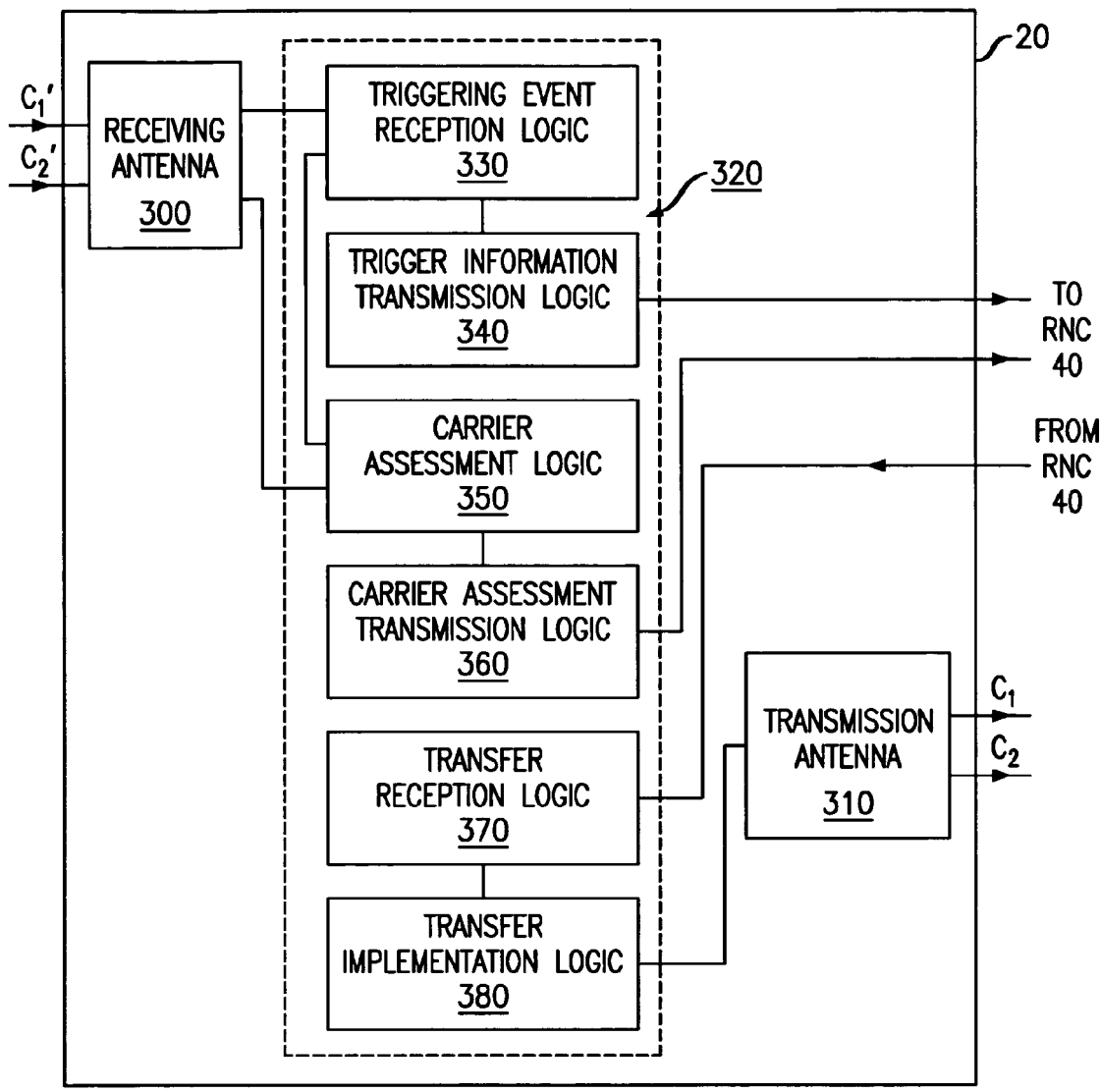
FIG. 3 illustrates components of a base station for use in the telecommunications network of FIG. 1.

FIG. 3 illustrates components of base station for use in the telecommunications network of FIG. 1. The base station 20 of FIG. 3 comprises: a reception antenna 300, a transmission antenna 310 and a base station controller 320. The base station further comprises a dedicated physical cabling link, which links base station 20 to a radio network controller.

The reception antenna 300 is operable to simultaneously receive signals C1' and C2' from user equipment 50 shown in FIG. 2. The transmission antenna 310 is operable to simultaneously transmit signals to user equipment on a plurality of carrier frequencies (in this case C1 and C2).

Base station controller 320 further comprises: trigger information reception logic 330, trigger information transmission logic 340, carrier assessment reception logic 350, carrier assessment transmission logic 360, transfer reception logic 370 and transfer implementation logic 380. The reception antenna is operable to communicate with trigger information reception logic and carrier assessment reception logic. Trigger information transmission logic 340 and carrier assessment transmission logic 360 is operable to communicate via the dedicated link with a network controller 40. The network controller is operable to communicate with transfer reception logic 370. Transfer implementation logic 380 is operable to communicate with transmission antenna 310. The operation of base station 20 will be further described in relation to the processing steps of FIG. 5.

Figure 4:
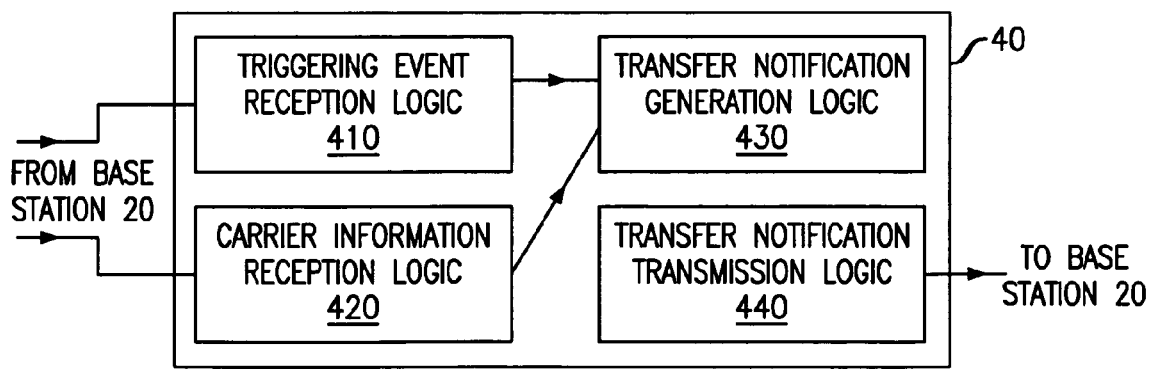
FIG. 4 illustrates components of a network controller for use in the telecommunications network of FIG. 1.

FIG. 4 illustrates components of a network controller for use in the telecommunications network of FIG. 1. Network controller 40 comprises: triggering event reception logic 410, carrier reception logic 420, transfer notification generation logic 430 and transfer notification transmission logic 440. Triggering event reception logic 410 and carrier reception logic 420 are operable to receive signals from base station 20. The triggering event reception logic 410 and carrier reception logic 420 are operable to communicate with transfer notification generation logic 430. Transfer notification generation logic is operable to receive signals indicative of the triggering event and an assessment of other carriers and generate a transfer notification. Once a transfer notification has been generated, transfer notification generation logic 430 communicate with transfer notification transmission logic 440 and a signal is generated and transmitted to the base station controller 320.

Figure 5:
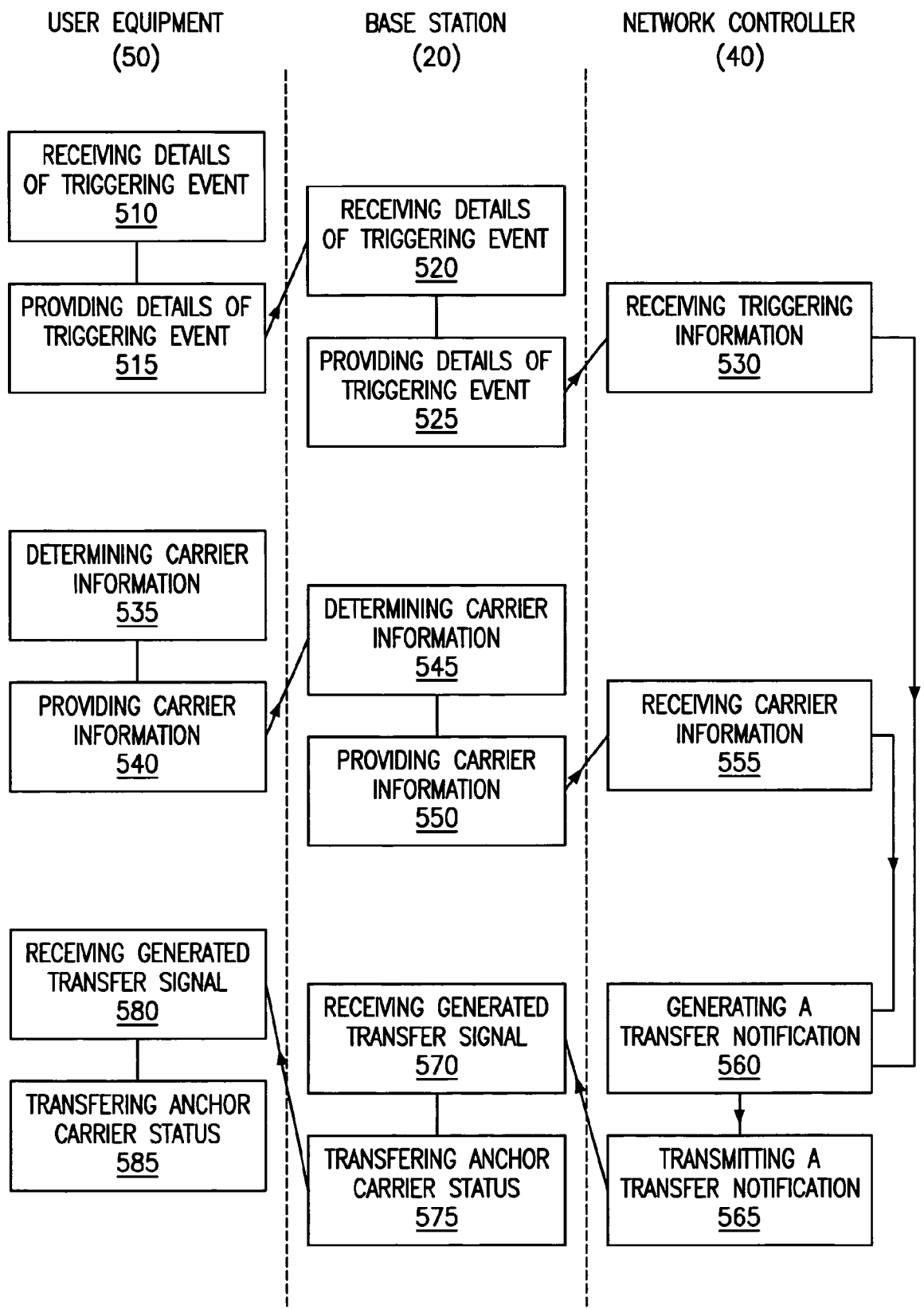
FIG. 5 illustrates the main processing steps of user equipment, a base station and network controller used in the telecommunications network of FIG. 1.

FIG. 5 illustrates the main processing steps of user equipment, a base station and a network controller used in the telecommunications network of FIG. 1. The main processing steps of transferring anchor carrier status from the first carrier to another carrier in a multi-carrier wireless telecommunications network are illustrated schematically as method 500. In the event that a measurable characteristic of a current anchor carrier drops beneath a predetermined first threshold value user equipment 50 and more particularly, triggering event reception logic 230 receives details of that triggering event. That step is illustrated as step 510 in FIG. 5. Once triggering event reception logic 230 has received the details of the triggering event it passes that information to trigger information transmission logic 240 which, in turn, passes the information in a data packet to the transmission antenna 210. The step of providing details of the triggering event is indicated as step 515 in FIG. 5.

In the embodiment shown in FIGS. 3, 2 and 5 the user equipment sends a packet of data regarding the triggering event to base station 20. That packet of information is received by the base station reception antenna 300 and is sent to trigger information reception logic 330. The step of receiving details of the triggering event is indicated as step 520 in FIG. 5.

It may be that the packet of data provided to the base station by user equipment is not opened or interpreted by base station 20. The information may simply be sent directly from base station 20 to network controller 40. The base station may, however, itself operate to interpret the details of the triggering event and the provide specific details of the triggering event to the network controller 40. In either case, the step of providing details (be it in packet form or interpreted data form) to network controller 40 is indicated by step 525 in FIG. 5.

The details provided from base station 20 to network controller 40 are sent via the dedicated physical link. The network controller triggering event reception logic 410 receives information from the base station regarding the triggering event. That step of receiving at the network controller is indicated by step 530 in FIG. 5.

In the event that triggering event reception logic determines that a triggering event has occurred, carrier assessment logic 250, provided at the user equipment, acts to determine which other carriers provided in the multi-carrier system have a measurable characteristic above the second threshold value. That is to say, the user equipment looks at all other carriers with which it has an active uplink or downlink and determines in particular whether the downlink carrier has a measurable characteristic above a second threshold value. That step of determining is indicated as step 535 in FIG. 5.

The determined information is then provided by carrier assessment transmission logic 260, in conjunction with transmission antenna 210 of user equipment 50, to a base station. This step is indicated as step 540 in FIG. 5. Base station reception antenna 300 receives a signal from user equipment 50 indicative of the characteristics of said carriers. The base station may simply determine that the information has been received or it may open the information provided by user equipment and independently generate values. In either case, the base station has a information which indicates which determines which other carriers have a measurable characteristic above a second threshold value. That step is indicated as step 545 in FIG. 5.

Once base station 20 has been provided with that information by user equipment 50 it acts to provide the information to network controller 40. That step is indicated as step 550 in FIG. 5. The base station transmits the information to a network controller via a dedicated link. Carrier reception logic 420 is provided at the network controller 40 and acts to receive the information regarding the alternative carriers available to user equipment 50. The step of receiving that information is indication by step 555 in FIG. 5.

In the event that network controller 40 receives information indicative of the triggering event (step 530) and it also receives information regarding alternative carriers available to user equipment 50 (step 555), transfer notification generation logic 430 of the network controller 40 acts to generate a transfer notification. The step of generating a transfer notification is indicated a step 560 in FIG. 5.

In the particular embodiment shown, the transfer notification is transmitted by transfer notification transmission logic 440 via a dedicated link to the base station controller 320. The step of transmitting the transfer notification is indicated as step 565 in FIG. 5.

The base station 20 receives a transfer notification generated by network controller 40 as step 570 and transfer downlink anchor carrier status by using transfer implementation logic 380. The step of transferring anchor carrier status is indicated as step 575. The base station, in turn, relays the transfer notification generated by network controller 40 to user equipment. It may do this simply by transferring its own anchor carrier status as step 575. The user equipment may thus receive anchor carrier information on a new downlink carrier and therefore indirectly receive an indication or signal at step 580 indicative that the anchor carrier has changed. Alternatively, the base station 20 may act to relay a transfer notification from network controller 40 to user equipment 50.

In response to transfer reception logic 270 of the user equipment 50 receiving a generated signal indicative of a transfer notification, transfer implementation logic 280 acts to transfer anchor carrier status (step 585) in the uplink carrier.

Figure 6:
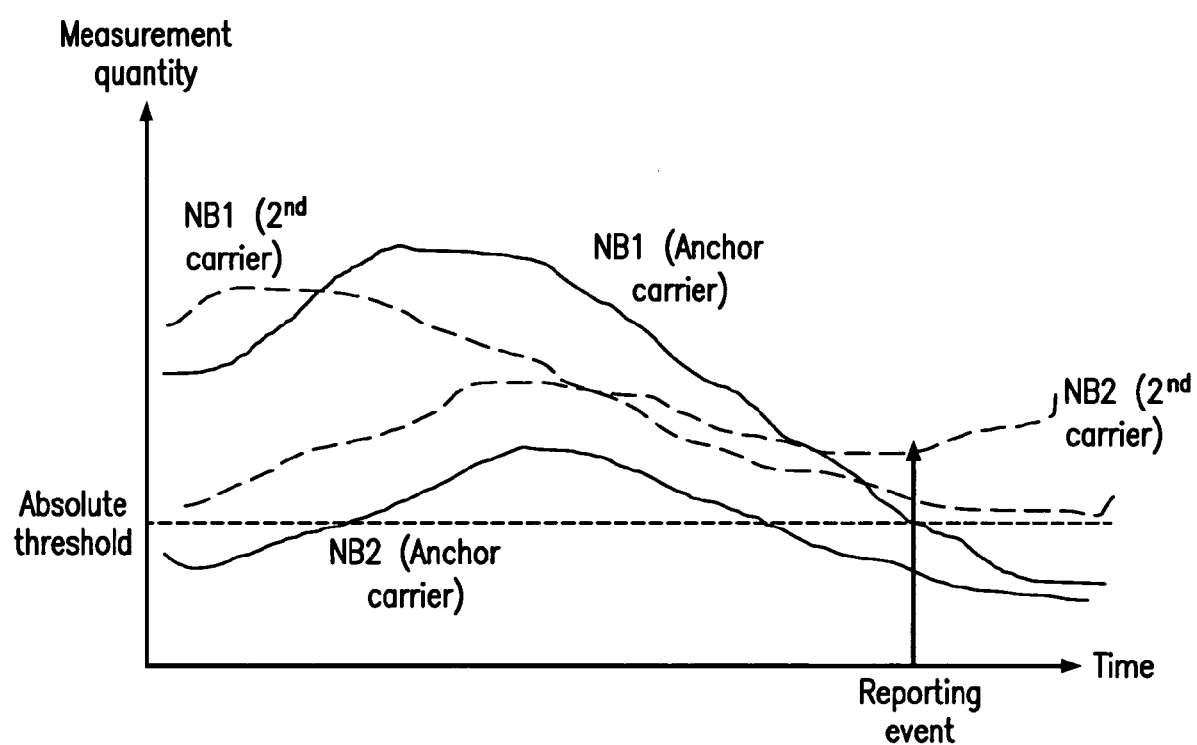
FIG. 6 is a graphical illustration of one example of a transfer trigger event.

FIG. 6 is a graphical illustration of one example of a transfer trigger event. FIG. 6 illustrates in more detail the type of triggering event detected by triggering event reception logic 230 of user equipment 50. FIG. 6 is a graph with a measurement quantity on the vertical axis and time on the horizontal axis. The measurement quantity may be any one of a number of measurable quantities. However, for ease of reference in this case the measured quantity will be assumed to be the pilot channel signal strength received on reception antenna 200 of user equipment 50. User equipment 50 continuously performs downlink carrier measurements on active downlink radio links. It does that for each carrier being received by reception antenna 200. In FIG. 6, user equipment is connected, as far as radio network controller 40 is concerned, to a first base station. That first base station is indicated here by the designation NB1. It can be seen that the user equipment is receiving and measuring the pilot channel signal strength for two carriers from the first base station. One of those carriers has been designated by the radio network controller as being the anchor carrier upon which mobility events between base stations and between sectors are based. The user equipment 50 is also receiving the information from base station NB1 on a second carrier indicated by a dashed line.

The graph also indicates that user equipment 50 is receiving signals from a second base station, base station NB2. Again, this base station is a dual carrier base station and is transmitting on the anchor carrier frequency (a solid line) and a second carrier indicated by a dashed line. The "anchor" carrier provided by NB1 and NB2 in the illustrated example are on the same carrier frequency. The second carrier provided by NB1 and NB2 in the illustrated example also have a common carrier frequency.

User equipment is operable to inform a base station when an inter-carrier handover (or "trigger") condition occurs. This is achieved by watching for a triggering event. In the case shown in FIG. 6 that triggering events occurs when the measurement quantity in this case the pilot signal strength of the anchor carrier's best cell (provided by NB1 in the illustrated case) is poorer than an absolute threshold whilst the measurement quantity of the second carrier's best cell is higher than an absolute threshold (provided by NB2 in the illustrated case). The absolute threshold or predetermined value is set at some margin better than the minimum level required for user equipment 50 to maintain a radio link. The measurement report generated by user equipment contains information regarding the second carrier's best cell.

The solid lines of FIG. 6 represent measurement on the anchor carrier from the first node B and from the second node B and the dashed line are measurements determined from the second carrier on base station 1 and base station 2. For simplicity, the hysteresis and time to trigger in the example shown in this Figure are zero. In this example, at the point at which it is determined the anchor carrier of the first base station NB1 drops below the absolute threshold the user equipment is receiving an indication that the second carrier frequency both from the first base station NB1 and the second base station NB2 is above that absolute threshold. At that stage user equipment generates details of the triggering event and the status of the cells provided by the second carrier and sends those details to a base station which in turns relays that information to a network controller. On receipt of that information, the network controller generates a transfer notification and performs, via a base station, an inter-carrier handover of anchor carrier status for this user equipment to the second carrier provided by NB2 before the anchor carrier downlink provided by the original anchor carrier on NB1 fails.

Figure 7:
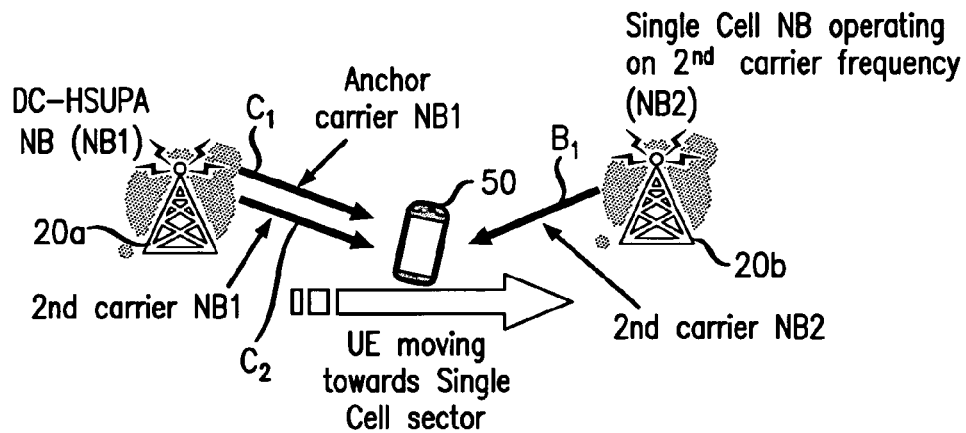
FIG. 7 is a schematic representation of a real life transfer scenario.

FIG. 7 schematically illustrates a representation of a real life scenario in which it may be necessary to transfer anchor carrier status. In the scenario shown in FIG. 7 user equipment 50 is moving from a first base station 20*a* to a second base station 20*b*. The first base station 20*a* is operating a dual carrier high speed up link packet access network that is to say, it is simultaneously transmitting on two carriers those carriers are indicated as 01 the anchor carrier on the first base station and C2 the second carrier provided on the first base station. The second base station 20*b* is operating on a single carrier indicated as B1. User equipment 50 is moving from a geographical area served by the first base station 20*a* to a geographical area served by the second base station 20*b*.

Figure 8:
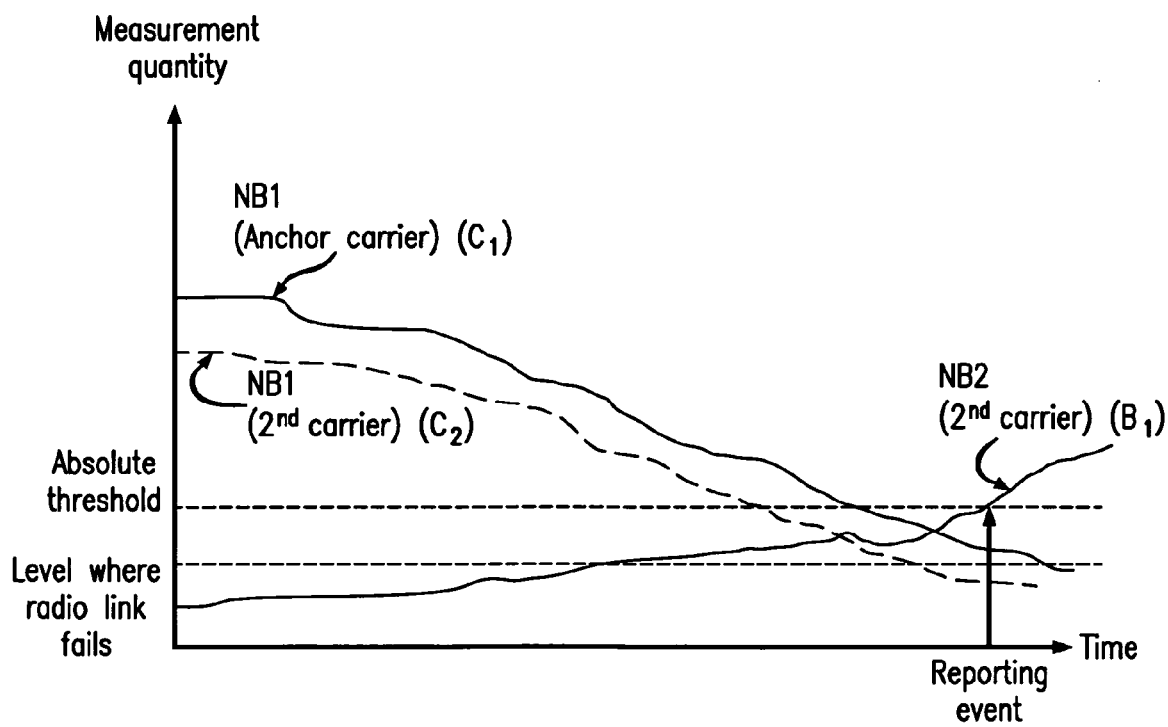
FIG. 8 is a graphical illustration of a second example of a transfer trigger event in the scenario illustrated by FIG. 7.

FIG. 8 illustrates graphically how transfer of anchor carrier status might occur in the scenario schematically illustrated in FIG. 7. In this example, hysteresis and time to trigger are zero. An absolute threshold is set with some margin for the measurement quantity required for a downlink radio link connection to successfully maintain connection with user equipment 50. The measured quantity for the first base station 20*a* for both carriers C1 and C2 degrades in time as the user equipment 50 moves away from the geographical area served by base station 20*a*. The measurement quantity for both carriers C1 and C2 falls below the absolute threshold. At this point, the measurement quantity monitored by user equipment 50 in respect of the second base station 20*b* on carrier B1 is still below the absolute threshold.

In this embodiment, the triggering event for anchor carrier transfer requires that the measured quantity of the current anchor carrier falls below a predetermined threshold and that there is a viable carrier to hand over to. When the measured quantity of C1 falls below the absolute threshold there is no full triggering event since there is no viable cell to hand over anchor carrier status to. As user equipment 50 moves further away from the first base station 20*a* and deeper into the geographical area served by the second base station 20*b* the measurement quantity for carrier B1 improves and becomes greater than the absolute threshold. At this point, the anchor carrier is still below the absolute threshold and both conditions for a triggering event in accordance with this embodiment are met, so a triggering event occurs. Information regarding B1 is sent to the network controller which then performs an inter-carrier handover to the second base station operating on the second carrier frequency, in this case B1. The network controller performs an inter-carrier handover from C1 to B1. User equipment then operates in single cell mode as served by base station 20*b* and maintains the cell-DCH state (no radio link failure is declared) and the user equipment is therefore successfully handed over to the second carrier before anchor downlink radio link C1 fails.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of transferring anchor carrier status from a first carrier to another carrier in a multi-carrier wireless telecommunications network, the multi-carrier wireless telecommunications network comprising a base station and user equipment operable to simultaneously transmit and receive signals on more than one radio frequency carrier within a sector of the telecommunications network, the method comprising:
    receiving details of a triggering event to be notified to a network node;
    the triggering event comprising a change in a measurable characteristic of the first carrier past a predetermined first threshold value;
    providing triggering information indicative of the triggering event to a network node;
    determining which of the other carriers of the multi-carrier telecommunications network have a measurable characteristic past a predetermined second threshold value;
    providing information relating to carriers determined to have a measurable characteristic past the predetermined second threshold value to the network node; and
    transferring anchor carrier status, in response to a received signal generated in response to receipt of the information relating to carriers determined to have a measurable characteristic past the predetermined second threshold and the triggering information, to one of the carriers determined to have a measurable characteristic past the predetermined second threshold value.

2. The method according to claim 1, wherein the triggering event comprises a measurable characteristic of the first carrier changing past a predetermined first threshold value for a predetermined period of time and the triggering information indicates to the network node that a measurable characteristic of the first carrier changing a predetermined first threshold value for a predetermined period of time should occur before the generated signal is provided.

3. The method according to claim 1, wherein the triggering event further comprises a measurable characteristic of the first carrier changing past a predetermined first threshold value whilst another carrier is determined to have a measurable characteristic past a predetermined second threshold value, and the triggering information indicates to the network node that a measurable characteristic of the first carrier has changed past a predetermined first threshold value and a carrier has been determined to have a measurable characteristic past a predetermined second threshold value before the generated signal is provided.

4. The method according to claim 1, wherein the step of determining comprises: the step of calculating for each other carrier a value by which the measurable characteristic passes the predetermined second threshold value, and the step of providing information relating to carriers determined to have a measurable characteristic past the predetermined second threshold value comprises: the step of providing an indication of the value by which each carrier passes the predetermined second threshold.

5. The method according to claim 3, further comprising the step of determining which carrier passes the predetermined second threshold by a value determined to be the largest.

6. The method according to claim 1, wherein the measurable characteristic comprises an indication representative of received signal strength, signal to noise ratio, or path loss experienced by each carrier.

7. A method implemented by a non-transitory computer readable storage medium, in which a program is saved, the program comprising instructions which, when they are executed in a programmable device, cause the transfer of anchor carrier status from a first carrier to another carrier in a multi-carrier wireless telecommunications network, the multi-carrier wireless telecommunications network comprising a base station and user equipment operable to simultaneously transmit and receive signals on more than one radio frequency carrier within a sector of the telecommunications network, the method comprising:
    receiving details of a triggering event to be notified to a network node;
    the triggering event comprising a change in a measurable characteristic of the first carrier past a predetermined first threshold value;
    providing triggering information indicative of the triggering event to a network node;
    determining which of the other carriers of the multi-carrier telecommunications network have a measurable characteristic past a predetermined second threshold value;
    providing information relating to carriers determined to have a measurable characteristic past the predetermined second threshold value to the network node; and
    transferring anchor carrier status, in response to a received signal generated in response to receipt of the information relating to carriers and the triggering information, to one of the carriers determined to have a measurable characteristic past the predetermined second threshold value.

8. User equipment operable to transfer anchor carrier status from a first carrier to another carrier in a multi-carrier wireless telecommunications network, the multi-carrier wireless telecommunications network comprising a base station and user equipment operable to simultaneously transmit and receive signals on more than one radio frequency carrier within a sector of the telecommunications network, the user equipment comprising:
    triggering event reception control logic operable to receive details of a triggering event to be notified to a network node; the triggering event comprising a measurable characteristic of the first carrier changing past a predetermined first threshold value;
    trigger information transmission control logic operable to provide triggering information indicative of the triggering event to a network node;
    carrier assessment control logic operable to determine which of the other carriers of the multi-carrier telecommunications network have a measurable characteristic past a predetermined second threshold value;
    carrier assessment transmission control logic operable to provide information relating to carriers determined to have a measurable characteristic past the predetermined second threshold value to the network node;
    transfer reception control logic operable to receive a transfer signal generated in response to receipt of the information relating to carriers determined to have a measurable characteristic past the predetermined second threshold and the triggering information; and
    transfer implementation control logic operable to transfer anchor carrier status to one of the carriers determined to have a measurable characteristic past the predetermined second threshold value.

9. A base station operable to transfer anchor carrier status from a first carrier to another carrier in a multi-carrier wireless telecommunications network, the multi-carrier wireless telecommunications network comprising a base station and user equipment operable to simultaneously transmit and receive signals on more than one radio frequency carrier within a sector of the telecommunications network, the base station comprising:

triggering event reception control logic operable to receive details of a triggering event to be notified to a network node; the triggering event comprising a measurable characteristic of the first carrier changing past a predetermined first threshold value;

trigger information transmission control logic operable to provide triggering information indicative of the triggering event to a network node;

carrier assessment control logic operable to determine which of the other carriers of the multi-carrier telecommunications network have a measurable characteristic past a predetermined second threshold value;

carrier assessment transmission control logic operable to provide information relating to carriers determined to have a measurable characteristic past the predetermined second threshold value to the network node;

transfer reception control logic operable to receive a transfer signal generated in response to receipt of the information relating to carriers determined to have a measurable characteristic past the predetermined second threshold and the triggering information; and transfer implementation control logic operable to transfer anchor carrier status to one of the carriers determined to have a measurable characteristic past the predetermined second threshold value.

10. A method of providing a transfer notification instructing transfer of anchor carrier status from a first carrier to another carrier in a multi-carrier wireless telecommunications network, the multi-carrier wireless telecommunications network comprising a base station and user equipment operable to simultaneously transmit and receive signals on more than one radio frequency carrier within a sector of the telecommunications network, in response to a triggering event comprising a measurable characteristic of the first carrier changing past a predetermined first threshold value, the method comprising:

receiving triggering information indicative of the triggering event, receiving information relating to any other carrier determined to have a measurable characteristic past a predetermined second threshold value;

generating a transfer notification in response to the information relating to carriers determined to have a measurable characteristic past the predetermined second threshold value and the triggering information, the transfer notification instructing transfer of anchor carrier status to one of the carriers determined to have a measurable characteristic past the predetermined second threshold value; and transmitting the transfer notification.

11. The method according to claim 10, wherein the triggering event wherein the triggering event further comprises a measurable characteristic of the first carrier changing past a predetermined first threshold value whilst another carrier is determined to have a measurable characteristic past a predetermined second threshold value, and the triggering information indicative of the triggering event indicates that a measurable characteristic of the first carrier has changed past a predetermined first threshold value and a carrier has been determined to have a measurable characteristic past a predetermined second threshold value before the transfer notification is generated.

12. The method according to claim 10, wherein the step of receiving information further comprises the step of receiving information for each carrier representative of a value by which the measurable characteristic is past the predetermined second threshold value.

13. The method according to claim 11, wherein the step of generating a transfer notification further comprises the step of calculating which of the carriers determined to have a measurable characteristic past the second predetermined threshold value, is past the predetermined threshold value by the largest amount and the transfer notification instructs transfer of anchor carrier status from the first carrier to a carrier determined to be past the second predetermined threshold by the largest amount.

14. A method implemented by a non-transitory computer readable storage medium, in which a program is saved, the program comprising instructions which, when they are executed in a programmable device, cause a transfer notification instructing transfer of anchor carrier status from a first carrier to another carrier in a multi-carrier wireless telecommunications network, the multi-carrier wireless telecommunications network comprising a base station and user equipment operable to simultaneously transmit and receive signals on more than one radio frequency carrier within a sector of the telecommunications network, in response to a triggering event comprising a measurable characteristic of the first carrier changing past a predetermined first threshold value, the method comprising:

receiving triggering information indicative of the triggering event;

receiving information relating to any other carrier determined to have a measurable characteristic past a predetermined second threshold value;

generating a transfer notification in response to the information relating to carriers determined to have a measurable characteristic past the predetermined second threshold value and the triggering information, the transfer notification instructing transfer of anchor carrier status to one of the carriers determined to have a measurable characteristic past the predetermined second threshold value; and transmitting the transfer notification.

15. A network node operable to provide a transfer notification instructing transfer of anchor carrier status from a first carrier to another carrier in a multi-carrier wireless telecommunications network in response to a triggering event comprising a measurable characteristic of the first carrier changing past a predetermined first threshold value, the multi-carrier wireless telecommunications network comprising a base station and user equipment operable to simultaneously transmit and receive signals on more than one radio frequency carrier within a sector of the telecommunications network, the network node comprising:

reception control logic operable to receive triggering information indicative of the triggering event, carrier reception control logic operable to receive information relating to carriers determined to have a measurable characteristic past a predetermined second threshold value; and transfer notification generation control logic operable to generate a transfer notification in response to the information relating to carriers determined to have a measurable characteristic past the predetermined second threshold value and the triggering information, transfer notification transmission control logic operable to transmit the transfer notification instructing transfer of anchor carrier status to one of the carriers determined to have a measurable characteristic past the predetermined second threshold value.

* * * * *